United States Patent
Papasakellariou et al.

(10) Patent No.: US 10,313,084 B2
(45) Date of Patent: Jun. 4, 2019

(54) TRANSMISSION OF ACKNOWLEDGEMENT SIGNALS IN A COMMUNICATION SYSTEM

(71) Applicant: Samsung Electronics Co., Ltd., Gyeonggi-do (KR)

(72) Inventors: Aris Papasakellariou, Houston, TX (US); Joon-Young Cho, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 16/201,554

(22) Filed: Nov. 27, 2018

(65) Prior Publication Data

US 2019/0109693 A1    Apr. 11, 2019

Related U.S. Application Data

(63) Continuation of application No. 14/802,348, filed on Jul. 17, 2015, now Pat. No. 10,142,078, which is a
(Continued)

(51) Int. Cl.
*H04L 5/00* (2006.01)
*H04W 72/04* (2009.01)
(Continued)

(52) U.S. Cl.
CPC .......... *H04L 5/0055* (2013.01); *H04L 1/1607* (2013.01); *H04L 1/1628* (2013.01);
(Continued)

(58) Field of Classification Search
CPC ... H04L 5/0055; H04L 1/1861; H04L 1/1607; H04L 1/1812; H04L 1/1825;
(Continued)

(56) References Cited

U.S. PATENT DOCUMENTS 6,983,147 B1    1/2006   Hans
9,112,689 B2    8/2015   Papasakellariou
(Continued)

FOREIGN PATENT DOCUMENTS

CN    1 567 759      1/2005
CN    101039165      9/2007
(Continued)

OTHER PUBLICATIONS

M. Nakamura, Y. Awad and S. Vadgama, "Adaptive control of link adaptation for high speed downlink packet access (HSDPA) in W-CDMA," The 5th International Symposium on Wireless Personal Multimedia Communications, Honolulu, HI, USA, 2002, pp. 382-386 vol. 2.doi: 10.1109/WPMC.2002.1088198 (Year: 2002).*
(Continued)

*Primary Examiner* — Omar J Ghowrwal
(74) *Attorney, Agent, or Firm* — The Farrell Law Firm, P.C.

(57) ABSTRACT

Methods and apparatuses are provided for transmitting hybrid automatic repeat request acknowledgement (HARQ-ACK) information by a terminal in a wireless communication system. A method includes receiving one or more transport blocks, determining a number of HARQ-ACK bits in response to the one or more transport blocks, determining an uplink resource for transmission of the HARQ-ACK bits, and transmitting the HARQ-ACK bits by using the determined uplink resource, wherein the uplink resource is associated with a first modulation order or with a second modulation order, different from the first modulation order, depending on the number of HARQ-ACK bits.

12 Claims, 10 Drawing Sheets

Related U.S. Application Data continuation of application No. 13/263,233, filed as application No. PCT/KR2010/001541 on Mar. 11, 2010, now Pat. No. 9,112,689.

(60) Provisional application No. 61/159,229, filed on Mar. 11, 2009.

(51) Int. Cl.
*H04L 1/18* (2006.01)
*H04L 1/16* (2006.01)
*H04W 88/08* (2009.01)

(52) U.S. Cl.
CPC .......... *H04L 1/1812* (2013.01); *H04L 1/1825* (2013.01); *H04L 1/1861* (2013.01); *H04W 72/0413* (2013.01); *H04W 72/0446* (2013.01); *H04W 88/08* (2013.01)

(58) Field of Classification Search
CPC ............ H04L 1/1628; H04W 72/0413; H04W 72/0446; H04W 88/08
See application file for complete search history.

(56) References Cited

U.S. PATENT DOCUMENTS

| | | | |
|---|---|---|---|
| 2006/0067238 A1 | 3/2006 | Olsson et al. | |
| 2007/0060167 A1* | 3/2007 | Damnjanovic | H04W 52/24 455/450 |
| 2007/0189235 A1 | 8/2007 | Chandra et al. | |
| 2007/0254662 A1 | 11/2007 | Khan et al. | |
| 2008/0013489 A1 | 1/2008 | Anigstein | |
| 2008/0212506 A1 | 9/2008 | Lee | |
| 2008/0248793 A1 | 10/2008 | Chang | |
| 2008/0253326 A1 | 10/2008 | Damnjanovic | |
| 2008/0310395 A1* | 12/2008 | Kashima | H04L 1/1896 370/350 |
| 2008/0313521 A1 | 12/2008 | Frederiksen et al. | |
| 2009/0245421 A1* | 10/2009 | Montojo | H04L 1/1664 375/298 |
| 2009/0274100 A1 | 11/2009 | Montojo et al. | |
| 2010/0098006 A1 | 4/2010 | Golitschek Edler Von Elbwart et al. | |
| 2010/0195587 A1 | 8/2010 | Ratasuk | |
| 2011/0032925 A1 | 2/2011 | Lee et al. | |
| 2011/0142000 A1 | 6/2011 | Han et al. | |
| 2017/0126371 A1 | 5/2017 | Goransson | |

FOREIGN PATENT DOCUMENTS

| | | |
|---|---|---|
| CN | 101247171 | 8/2008 |
| EP | 2 427 008 | 3/2012 |

OTHER PUBLICATIONS

Dictionary.com. Define Controller at Dictionary.com. [retrieved on Dec. 31, 2015]. Retrieved from the Internet: <URL: http://dictonary.reference.com/browse/controller>.
PCT/ISA/237 Written Opinion issued on PCT/KR2010/001541, dated Oct. 14, 2010 (4 pp.).
PCT/ISA/210 Search Report issued on PCT/KR2010/001541, dated Oct. 14, 2010 (3 pp.).
3GPP TS 36.212 V8.5.0 (Dec. 2008), 3rd Generation Partnership Project; Technical Specification Group Radio Access Network; Evolved Universal Terrestrial Radio Access (E-EUTRA); Multiplexing and channel coding (Release 8) pp. 58.
3GPP TS 36.211 V8.5.0 (Dec. 2008), 3rd Generation Partnership Project; Technical Specification Group Radio Access Network; Evolved Universal Terrestrial Radio Access (E-EUTRA); Physical Channels and Modulation (Release 8) pp. 81.
ZTE, "Uplink Control Channel Design for LTE-Advanced", R1-090629, 3GPP TSG RAN WG1 Meeting #56, Feb. 9-13, 2009, 5 pages.
European Search Report dated Mar. 6, 2017 issued in counterpart application No. 10751043.0-1875, 9 pages.
Chinese Office Action dated Aug. 31, 2017 issued in counterpart application No. 201510025495.8, 14 pages.

* cited by examiner

US 10,313,084 B2

TRANSMISSION OF ACKNOWLEDGEMENT SIGNALS IN A COMMUNICATION SYSTEM

PRIORITY

This application is a Continuation Application of U.S. patent application Ser. No. 14/802,348, filed in the U.S. Patent and Trademark Office on Jul. 17, 2015, which is a Continuation Application of U.S. application Ser. No. 13/263,233, filed in the U.S. Patent and Trademark Office on Oct. 6, 2011, now U.S. Pat. No. 9,112,689, issued on Aug. 18, 2015, which is a U.S. National Stage Application of International Application No. PCT/KR2010/001541, filed on Mar. 11, 2010, which claims priority to U.S. Provisional Application No. 61/159,229, filed on Mar. 11, 2009, the contents of each of which are incorporated herein by reference.

BACKGROUND OF THE INVENTION

1. Field of the Invention

The present invention is directed to wireless communication systems and, more specifically, to the transmission of acknowledgment signals in the uplink of a communication system.

2. Description of the Related Art

A communication system consists of the DownLink (DL) conveying transmissions of signals from a base station (Node B) to User Equipments (UEs), and of the UpLink (UL), conveying transmissions of signals from UEs to the Node B. A UE, also commonly referred to as a terminal or a mobile station, may be fixed or mobile and may be a wireless device, a cellular phone, a personal computer device, etc. A Node B is generally a fixed station and may also be referred to as a Base Transceiver System (BTS), an access point, or some other terminology.

The UL signals consist of data signals, carrying the information content, control signals, and Reference Signals (RS), which are also known as pilot signals. The UEs convey UL data signals through a Physical Uplink Shared CHannel (PUSCH). The UL control signals include acknowledgement signals associated with the application of Hybrid Automatic Repeat reQuest (HARD) and other control signals. A UE transmits an HARQ-ACKnowledgement (HARQ-ACK) signal in response to the reception of Transport Blocks (TBs). Depending on whether the reception of a TB is correct or incorrect, the respective HARQ-ACK bit is an ACK or a NAK which can be respectively represented by a bit value of "1" or a bit value of "0". The HARQ-ACK signal is transmitted over a Transmission Time Interval (TTI) either in a Physical Uplink Control CHannel (PUCCH) or, together with data, in the PUSCH.

An exemplary structure for the PUCCH transmission in a TTI, which for simplicity is assumed to consist of one sub-frame, is shown in FIG. 1. The sub-frame 110 includes two slots. Each slot 120 includes $N_{symb}^{UL}$ symbols used for the transmission of HARQ-ACK signals or Reference Signals (RS). Each symbol 130 further includes a Cyclic Prefix (CP) to mitigate interference due to channel propagation effects. The PUCCH transmission in the first slot may be at a different part of the operating BandWidth (BW) than the PUCCH transmission in the second slot. Some symbols in each slot can be used for RS transmission to provide channel estimation and enable coherent demodulation of the received HARQ-ACK signal. The transmission BW is assumed to consist of frequency resource units which will be referred to as Physical Resource Blocks (PRBs). Each PRB is further assumed to consist of $N_{sc}^{RB}$ sub-carriers, or Resource Elements (REs), and a UE transmits its HARQ-ACK signals over one PRB 140 in the PUCCH.

An exemplary structure for the HARQ-ACK signal transmission in one of the sub-frame slots is illustrated in FIG. 2. The transmission structure 210 comprises of HARQ-ACK signals and RS to enable coherent demodulation of the HARQ-ACK signals. The HARQ-ACK bits 220 modulate 230 a "Constant Amplitude Zero Auto-Correlation (CA-ZAC)" sequence 240, for example with Binary Phase Shift Keying (BPSK) for 1 HARQ-ACK bit or with Quadrature Phase Shift Keying (QPSK) for 2 HARQ-ACK bits which is then transmitted after performing the Inverse Fast Fourier Transform (IFFT) operation as it is subsequently described. Each RS 250 is transmitted through the unmodulated CAZAC sequence. The signal transmission in FIG. 2 is contiguous in frequency and is referred to as Single-Carrier (SC) transmission.

An example of CAZAC sequences is given by $$c_k(n) = \exp\left[\frac{j2\pi k}{Z}\left(n + n\frac{n+1}{2}\right)\right]$$

where z is the length of the CAZAC sequence, n is the index of an element of the sequence $n=\{0, 1, \ldots, Z-1\}$, and k is the index of the sequence. If Z is a prime integer, there are Z-1 distinct sequences which are defined as k ranges in $\{0, 1, \ldots, Z-1\}$. If the PRBs comprise of an even number of REs, such as for example $N_{sc}^{Rb}=12$ REs, CAZAC sequences with even length can be directly generated through computer search for sequences satisfying the CAZAC properties.

FIG. 3 shows an exemplary transmitter structure for a CAZAC sequence that can be used without modulation as RS or with BPSK or QPSK modulation as HARQ-ACK signal. The frequency-domain version of a computer generated CAZAC sequence 310 is used. The REs corresponding to the assigned PUCCH BW are selected 320 for mapping 330 the CAZAC sequence, an IFFT is performed 340, and a Cyclic Shift (CS) applies to the output 350 as it is subsequently described. Finally, the cyclic prefix (CP) 360 and filtering 370 are applied to the transmitted signal 380. Zero padding is assumed to be inserted by the reference UE in REs used for the signal transmission by other UEs and in guard REs (not shown).

Moreover, for brevity, additional transmitter circuitry such as digital-to-analog converter, analog filters, amplifiers, and transmitter antennas as they are known in the art, are not shown. The reverse (complementary) transmitter functions are performed for the reception of the CAZAC sequence. This is conceptually illustrated in FIG. 4 where the reverse operations of those in FIG. 3 apply. An antenna receives RF analog signal and after further processing units (such as filters, amplifiers, frequency down-converters, and analog-to-digital converters) the digital received signal 410 is filtered 420 and the CP is removed 430. Subsequently, the CS is restored 440, a Fast Fourier Transform (FFT) 450 is applied, and the transmitted REs 460 are selected 465. FIG. 4 also shows the subsequent correlation 470 with the replica 480 of the CAZAC sequence. Finally, the output 490 is obtained which can then be passed to a channel estimation unit, such as a time-frequency interpolator, in case of a RS, or can to detect the transmitted information, in case the CAZAC sequence is modulated by HARQ-ACK bits.

Different CSs of the same CAZAC sequence provide orthogonal CAZAC sequences. Therefore, different CSs of the same CAZAC sequence can be allocated to different UEs in the same PUCCH PRB and achieve orthogonal multiplexing for the respective HARQ-ACK signal transmissions. This principle is illustrated in FIG. 5. In order for the multiple CAZAC sequences 510, 530, 550, 570 generated correspondingly from multiple CSs 520, 540, 560, 580 of the same root CAZAC sequence to be orthogonal, the CS value Δ 590 should exceed the channel propagation delay spread D (including a time uncertainty error and filter spillover effects). If $T_s$ is the symbol duration, the number of such CSs is $\lfloor T_s/D \rfloor$, where the $\lfloor \ \rfloor$ (floor) function rounds a number to its previous integer. Orthogonal multiplexing can also be in the time domain using Orthogonal Covering Codes (OCC). The symbols for HARQ-ACK and RS transmission in each slot are respectively multiplied with a first OCC and a second OCC but further details are omitted for brevity as these multiplexing aspects are not material to the invention. The number of resources in a PUCCH PRB is determined by the product of the number of CS for the CAZAC sequence times the OCC length. For 6 CS, length 4 OCC for the symbols used for HARQ-ACK signal transmission, and length 3 OCC for the symbols used for RS transmission, the number of resources for HARQ-ACK signaling in a PRB is 6×3=18 (the smaller OCC length applies).

A UE can determine the PUCCH resource (PRB, CS, OCC) for its HARQ-ACK signal transmission either through explicit indication from its serving Node B or through implicit indication. The latter can be based on the resources used for the transmission of the Scheduling Assignment (SA) in the Physical Downlink Control CHannel (PDCCH). The SA configures the parameters for the reception by the UE of TBs in response to which the UE subsequently transmits an HARQ-ACK signal. An exemplary PDCCH transmission considers that the REs carrying each SA are grouped into Control Channel Elements (CCEs). For a given number of SA information bits, the number of CCEs depends on the channel coding rate (QPSK modulation is assumed). For a UE with low Signal-to-Interference and Noise Ratio (SINR), the Node B may use a low channel coding rate to achieve a desired BLock Error Rate (BLER) while it may use a high coding rate for a UE with high SINR. Therefore, a SA may require more CCEs for its transmission to a low SINR UE. Typical CCE aggregation levels follow a "tree-based" structure consisting, for example, of 1, 2, 4, and 8 CCEs.

FIG. 6 further illustrates the PDCCH transmission using CCEs. After channel coding and rate matching of the SA information bits (not shown), the encoded SA bits are mapped to CCEs in the logical domain. The first 4 CCEs, CCE1 601, CCE2 602, CCE3 603, and CCE4 604 are used for the SA transmission to UE1. The next 2 CCEs, CCE5 611 and CCE6 612, are used for the SA transmission to UE2. The next 2 CCEs, CCE7 621 and CCE8 622, are used for the SA transmission to UE3. Finally, the last CCE, CCE9 631, is used for the SA transmission to UE4. After further processing which can include bit scrambling, modulation, interleaving, and mapping to REs 640, each SA is transmitted in the PDCCH 650.

At the UE receiver, the reverse operations are performed (not shown for brevity) and if the SA is correctly decoded, the UE proceeds to receive the TBs. A one-to-one mapping exists between the PUCCH resources for HARQ-ACK signal transmission and the CCEs used for the SA transmission. For example, if a single PUCCH resource is used for HARQ-ACK signal transmission, it may correspond to the CCE with the lowest index (first CCE) for the respective SA. Then, UE1, UE2, UE3, and UE4 use respectively PUCCH resource 1, 5, 7, and 9 for their HARQ-ACK signal transmission. If all resources within a PUCCH PRB are used, the resources in the immediately next PRB can be used. The first PUCCH PRB for HARQ-ACK signal transmission may be informed by the serving Node B through broadcast signaling. In order to support higher data rates and improve the spectral efficiency relative to legacy communication systems, BWs larger than the ones of Component Carriers (CCs) for legacy systems are needed. These larger BWs may be achieved by the aggregation of multiple legacy CCs. For example, a BW of 100 MHz may be achieved by aggregating five 20 MHz CCs. The reception of TBs in each DL CC is configured by a respective SA as described in FIG. 6.

Each DL CC is associated with an UL CC which contains respective resources for the HARQ-ACK signal transmission. In case each different DL CC is linked to a different UL CC, the resources for HARQ-ACK signal transmission may be as for the legacy systems. In case multiple DL CCs are linked to the same UL CC for HARQ-ACK signal transmission, separate resources may be pre-assigned in the UL CC for the transmission of HARQ-ACK signals in response to TBs in each of the DL CCs. This is further illustrated in FIG. 7 where two DL CCs, 710 and 720, are linked to one UL CC 730 and the resources for the HARQ-ACK signal transmission in response to TBs transmitted in the first DL CC are always in a first set of UL resources 740 while the resources for the HARQ-ACK transmission in response to TBs transmitted in the second DL CC are always in a second set of UL resources 750.

The conventional approach for a UE to transmit HARQ-ACK signals in response to the reception of TBs in multiple DL CCs is to simply extend the HARQ-ACK signaling method in case of a single DL CC and simultaneously transmit multiple HARQ-ACK signals, each corresponding to a DL CC. The main disadvantage of this approach stems for the limitation in the maximum UE transmission power. Simultaneous transmission of multiple HARQ-ACK signals increases the peak-to-average power ratio (PAPR) of the combined signal transmission as the single-carrier property is not preserved. Also, channel estimation becomes worse as the RS power is distributed in multiple resources and the total interference is increased as HARQ-ACK signals are transmitted in multiple resources.

In order to address the previous shortcomings for the transmission of multiple HARQ-ACK signals, an alternative method is to transmit a single HARQ-ACK signal while selecting the transmission resources to provide additional degrees of freedom and hence allow for more HARQ-ACK information to be implicitly conveyed. For example, if the UE receives a single TB in each of four DL CCs and each DL CC is linked to a different UL CC then, by selecting the UL CC where the HARQ-ACK signal is transmitted, the UE can convey 2 HARQ-ACK bits and convey the remaining 2 HARQ-ACK bits by applying QPSK modulation to the transmitted HARQ-ACK signal. Although this CC selection method avoids the shortcomings of multiple simultaneous HARQ-ACK signal transmissions, it cannot generally provide adequate multiplexing capacity. For example, if the UE receives two TBs in any of the four DL CCs, then at least 5 HARQ-ACK bits will need to be transmitted which is not possible using only UL CC selection and QPSK modulation.

Moreover, having a variable UL CC convey the HARQ-ACK signal transmission is not desirable for implementation and performance reasons.

Therefore, there is a need to determine transmission methods for HARQ-ACK signals in response to TBs transmitted in multiple DL CCs that avoid increasing the PAPR and also avoid degrading the reception reliability of the HARQ-ACK signal while providing the required multiplexing capacity for the transmission of the HARQ-ACK bits.

There is another need to minimize the interference generated by the HARQ-ACK signal transmission and minimize the respective required resources by avoiding the transmission of multiple HARQ-ACK signals per UE transmitter antenna.

There is another need to determine rules for applying different principles to the transmission of a single HARQ-ACK signal depending on the number of HARQ-ACK bits that need to be conveyed.

SUMMARY OF THE INVENTION

Accordingly, the present invention has been designed to solve at least the aforementioned limitations and problems in the prior art and the present invention provides methods and apparatus for a UE to transmit ACKnowledgement signals associated with the use of a Hybrid Automatic Repeat reQuest (HARQ) process (HARQ-ACK signals) that are in response to the reception by the UE of Transport Blocks (TBs) transmitted by a Node B in multiple Component Carriers (CCs).

In accordance with an aspect of the present invention, a method is provided for transmitting HARQ-ACK information by a terminal in a wireless communication system, including receiving one or more transport blocks, including determining a number of HARQ-ACK bits in response to the one or more transport blocks, determining an uplink resource for transmission of the HARQ-ACK bits, and transmitting the HARQ-ACK bits by using the determined uplink resource, wherein the uplink resource is associated with a first modulation order or with a second modulation order depending on the number of HARQ-ACK bits, and wherein the first modulation order is different from the second modulation order.

In accordance with another aspect of the present invention, a terminal is provided for transmitting HARQ-ACK information in a wireless communication system, including a transceiver, and a controller coupled with the transceiver and configured to control to receive one or more transport blocks, determine a number of HARQ-ACK bits in response to the one or more transport blocks, determine an uplink resource for transmission of the HARQ-ACK bits, and transmit the HARQ-ACK bits by using the determined uplink resource, wherein the uplink resource is associated with a first modulation order or with a second modulation order depending on the number of HARQ-ACK bits, and wherein the first modulation order is different from the second modulation order.

In accordance with another aspect of the present invention, a method is provided for receiving HARQ-ACK information by a base station in a wireless communication system, including transmitting one or more transport blocks, determining a number of HARQ-ACK bits in response to the one or more transport blocks, determining an uplink resource for transmission of the HARQ-ACK bits, and receiving the HARQ-ACK bits by using the determined uplink resource, wherein the uplink resource is associated with a first modulation order or with a second modulation order depending on the number of HARQ-ACK bits, and wherein the first modulation order is different from the second modulation order.

In accordance with another aspect of the present invention, a base station is provided receiving HARQ-ACK information by a base station in a wireless communication system, including a transceiver, and a controller coupled with the transceiver and configured control to transmit one or more transport blocks, determine a number of HARQ-ACK bits in response to the one or more transport blocks, determine an uplink resource for transmission of the HARQ-ACK bits, and receive the HARQ-ACK bits by using the determined uplink resource, wherein the uplink resource is associated with a first modulation order or with a second modulation order depending on the number of HARQ-ACK bits, and wherein the first modulation order is different from the second modulation order.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE PRESENT INVENTION

The present invention will now be described more fully hereinafter with reference to the accompanying drawings. This invention may, however, be embodied in many different forms and should not be construed as limited to the embodiments set forth herein. Rather, these embodiments are provided so that this disclosure will be thorough and complete and will fully convey the scope of the invention to those skilled in the art.

Additionally, although the present invention is described in relation to an Orthogonal Frequency Division Multiple Access (OFDMA) communication system, it also applies to all Frequency Division Multiplexing (FDM) systems in general and to Single-Carrier Frequency Division Multiple Access (SC-FDMA), OFDM, FDMA, Discrete Fourier Transform (DFT)-spread OFDM, DFT-spread OFDMA, SC-FDMA, and SC-OFDM in particular.

Methods and apparatus are described for increasing the information multiplexing capacity in a single HARQ-ACK signal transmitted from a UE in response to the reception of TBs in multiple DL CCs. It is assumed that for each DL CC, separate PUCCH resources exist for the HARQ-ACK signal transmission in response to reception of TBs in the respective DL CC.

The present invention considers that the UE can select the resources for the transmission of the HARQ-ACK signal based on the value of the transmitted HARQ-ACK bits. These resources are not necessarily confined to the ones corresponding to HARQ-ACK signal transmission from a single DL CC but combinations of resources corresponding to multiple DL CCs can be used for the transmission of a single HARQ-ACK signal in each of the sub-frame slots. These resources are derived from some or all PDCCH CCEs (not necessarily from only the first CCE) used to transmit the SAs associated with the reception of TBs over N DL CCs for which HARQ-ACK information is subsequently generated and transmitted by the UE to its serving Node B. For example, for the transmission of SAs associated with the application of the Multiple Input Multiple Output (MIMO) transmission principle wherein the Node B can convey multiple TBs to a UE in a sub-frame of the same DL CC, the size of the SA is typically large enough so that of 2 PDCCH CCEs can be always assumed for its transmission. The number of available resources for the transmission of an HARQ-ACK signal is $$T = \sum_{j=1}^{N} K_j \text{ where } K_j$$

where $K_j$ is the number of CCEs used for the SA transmission in the $j^{th}$ DL CC, $j=1, \ldots, N$.

In addition, the sub-frame slots may also contribute in the total number of available resources if either the same CS in each of the L=2 sub-frame slots is used for two combinations of HARQ-ACK bits having length-2 OCC in each slot or if different HARQ-ACK bits are transmitted in each sub-frame slot as they will be subsequently described.

Figure 1:
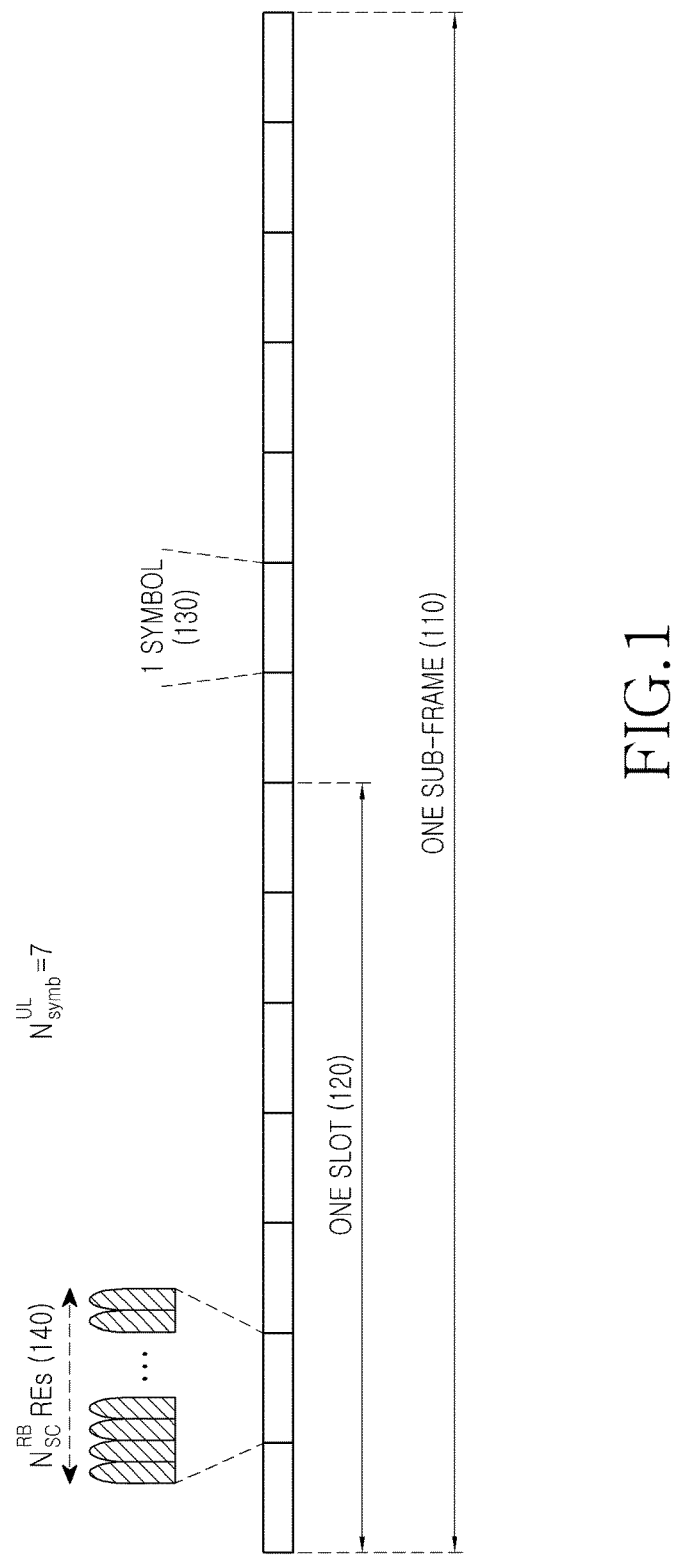
FIG. 1 is a diagram illustrating an exemplary PUCCH sub-frame structure.
Figure 2:
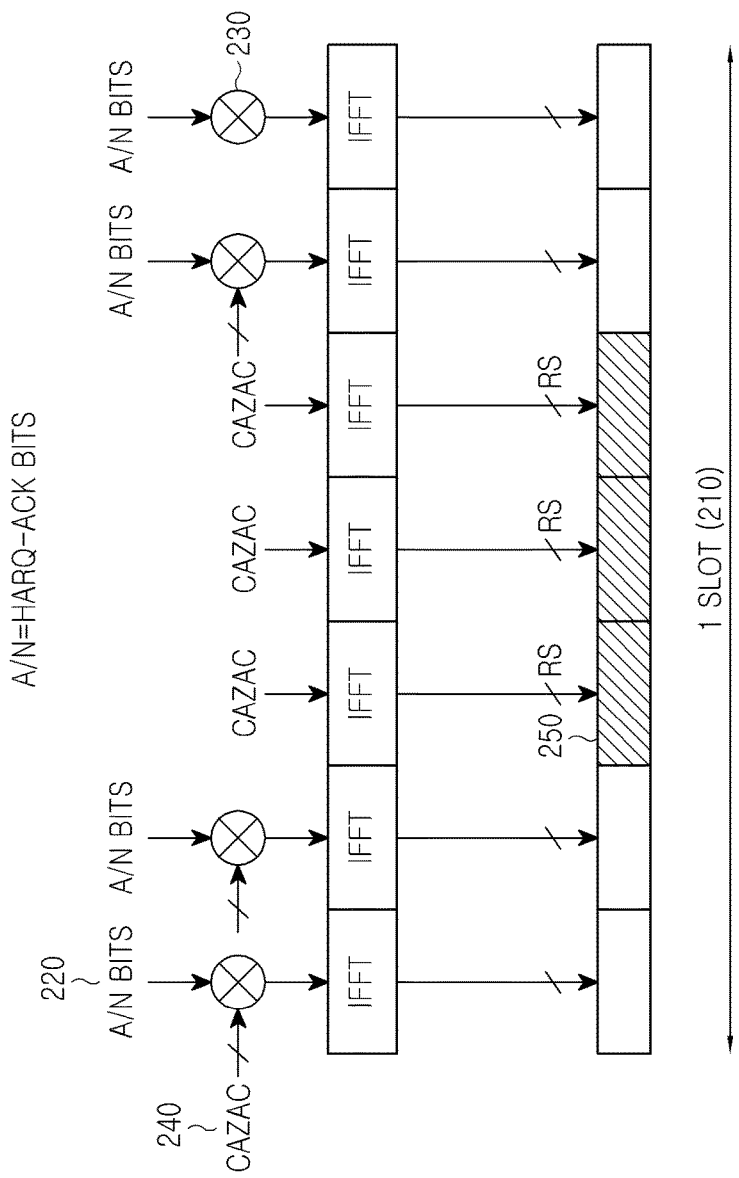
FIG. 2 is a diagram illustrating an exemplary structure for HARQ-ACK signal transmission in one slot of a PUCCH sub-frame.
Figure 3:
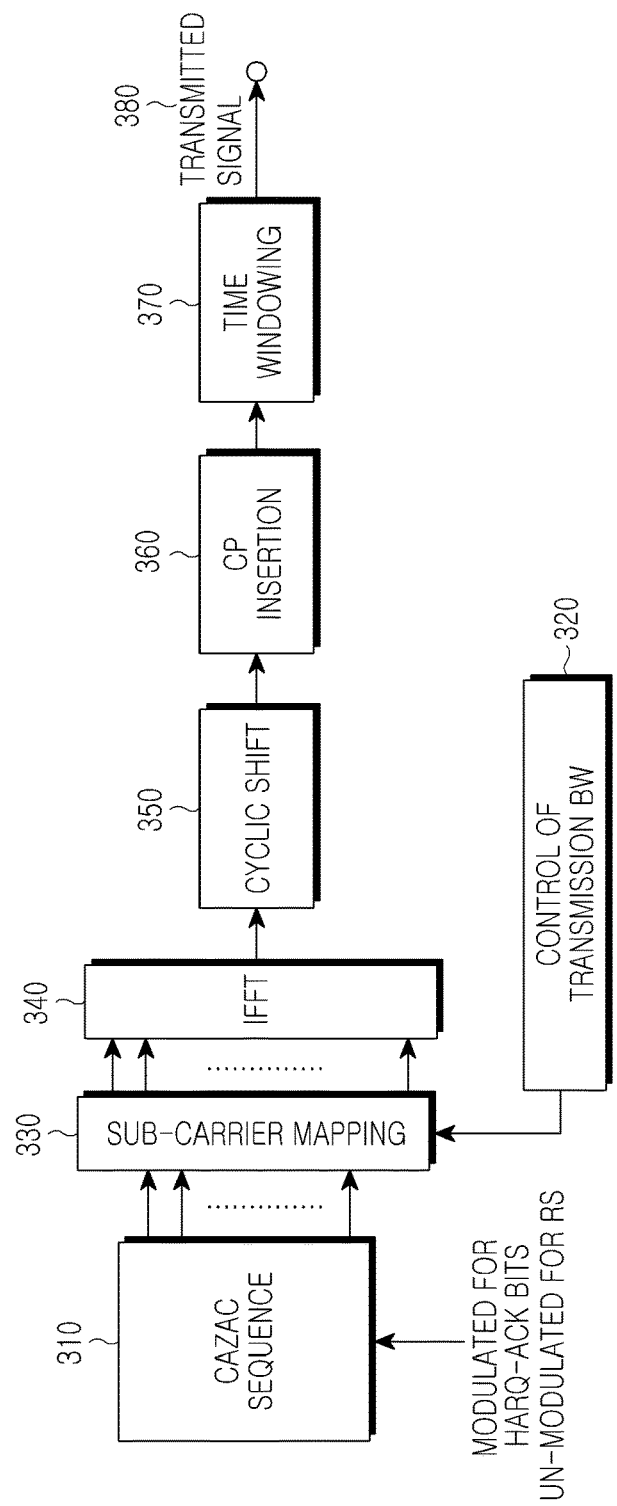
FIG. 3 is a block diagram illustrating an exemplary transmitter structure for a CAZAC sequence.
Figure 4:
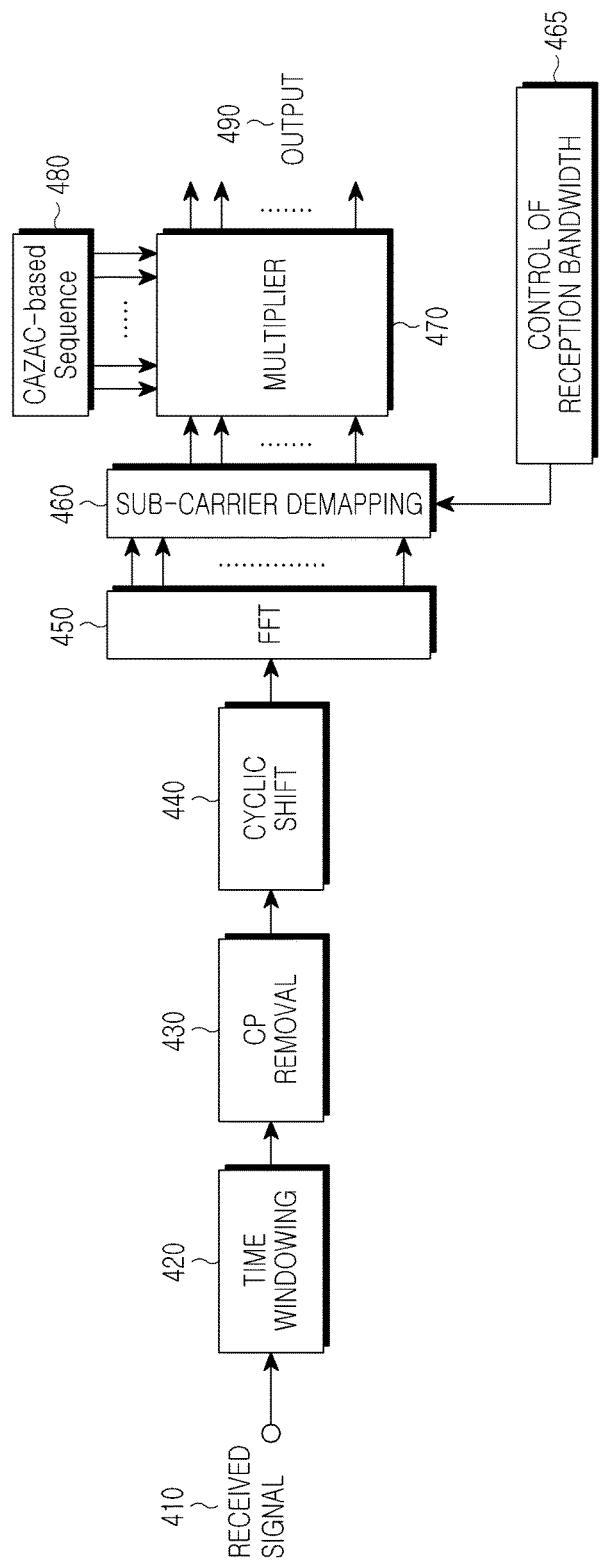
FIG. 4 is a block diagram illustrating an exemplary receiver structure for a CAZAC sequence.
Figure 5:
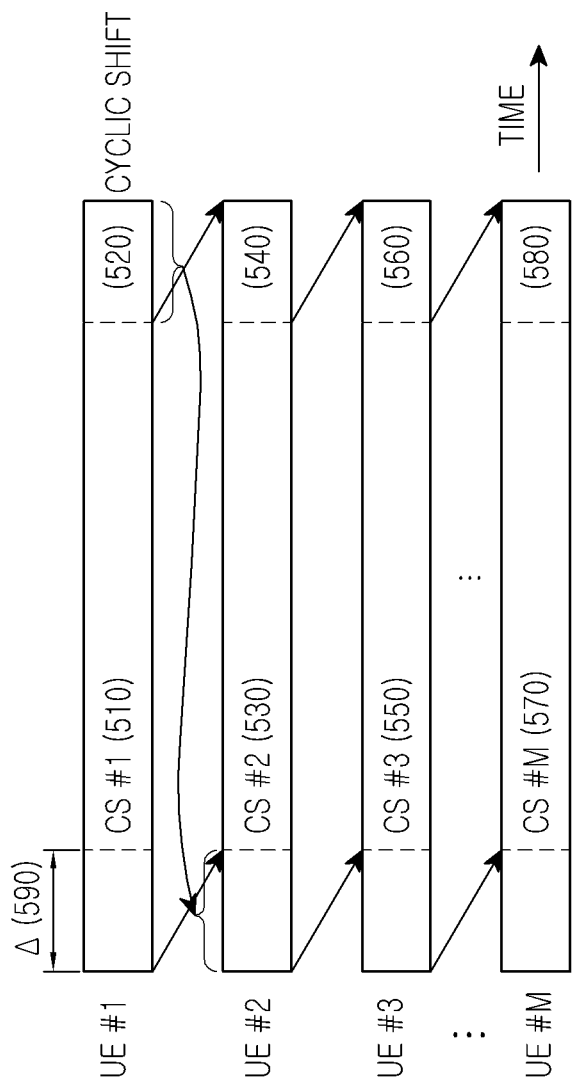
FIG. 5 is a diagram illustrating an exemplary multiplexing of CAZAC sequences through the application of different cyclic shifts.
Figure 6:
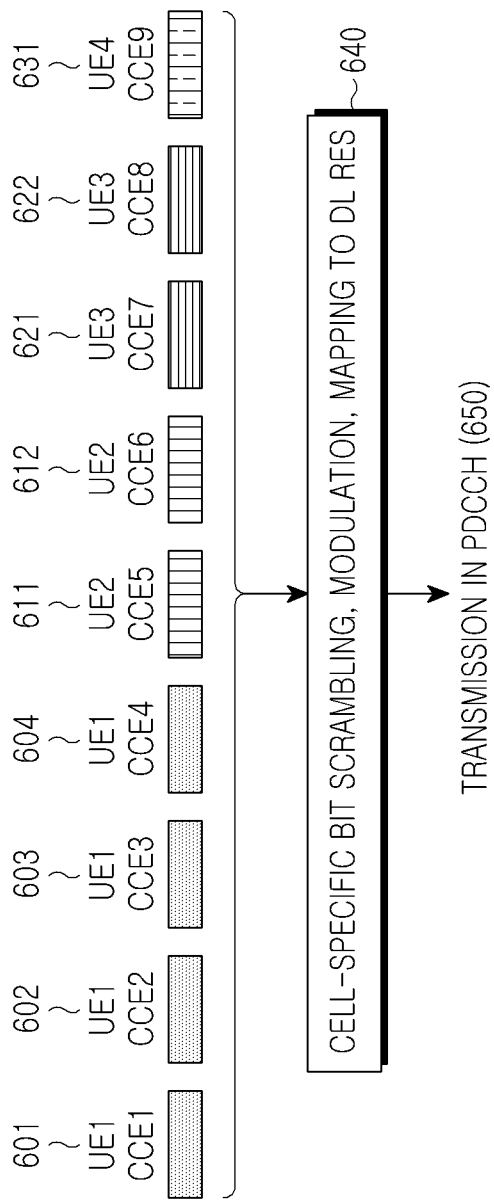
FIG. 6 is a block diagram illustrating the PDCCH transmission using CCEs.
Figure 7:
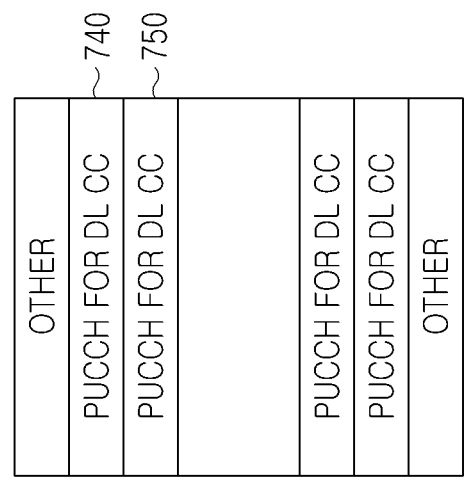
FIG. 7 is a diagram illustrating the availability of different resources for HARQ-ACK signal transmission in an UL CC in response to reception of TBs in multiple DL CCs.
Figure 7:
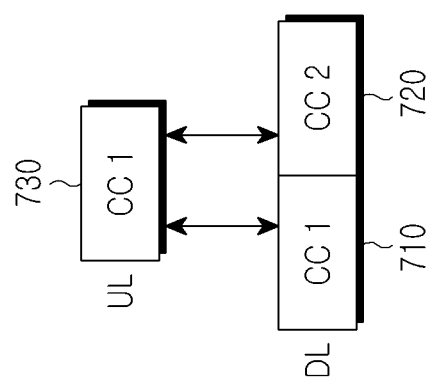
Figure 8:
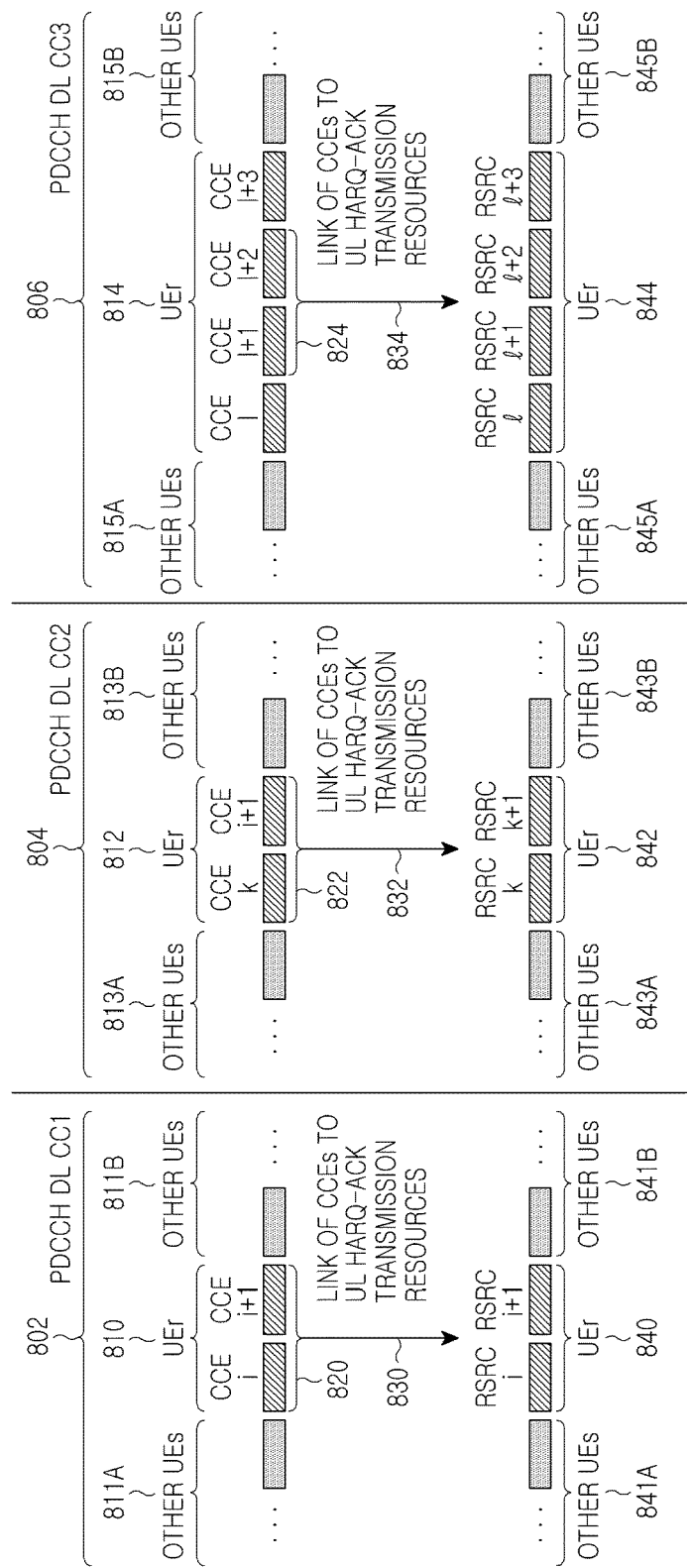
FIG. 8 is a diagram illustrating the generation of resources for HARQ-ACK signal transmission using the CCEs that convey the SAs for the reception of TBs in multiple DL CCs.

FIG. 8 further illustrates the concept for generating T=8 UL resources for the transmission by a reference UE of an HARQ-ACK signal is response to the reception of TBs over N=3 DL CCs, DL CC1 802, DL CC2 804, and DL CC3 806. The SAs associated with the reception of TBs in each of the DL CCs are assumed to be separately encoded and transmitted in the respective DL CC but this is not a limiting aspect of the invention and joint coding and transmission of the SAs may also be used. In the PDCCH of DL CC1,the SA transmission to the reference UE, UEr 810, is allocated $K_1=2$ CCEs, CCE i and CCE i+1 820. The remaining CCEs in the PDCCH of DL CC1 are allocated to other UEs 811A and 811B. In the PDCCH of DL CC2,the SA transmission to the reference UE, UEr 812, is allocated $K_2=2$ CCEs, CCE k and CCE k+1 822. The remaining CCEs are allocated to other UEs 813A and 813B. In the PDCCH of DL CC3,the SA transmission to the reference UE, UEr 814, is allocated $K_3=4$ CCEs, CCE 1, CCE 1+1, CCE 1+2, and CCE 1+3 824. The remaining CCEs are allocated to other UEs 825A and 825B. Using a one-to-one mapping, the CCEs in the PDCCH of DL CC1,the PDCCH of DL CC2,and the PDCCH of DL CC3 are respectively mapped, 830, 832, and 834, to the respective UL resources for the transmission of HARQ-ACK signals, 840 for UEr and 841A and 841B for other UEs, 842 for UEr and 843A and 843B for other UEs, and 844 for UEr and 845A and 845B for other UEs. The total resources (RSRC) available for the transmission of an ACK/NAK channel from the reference UE are {RSRC i, RSRC i+1, RSRC k, RSRC k+1, RSRC i, RSRC i+1, RSRC k, RSRC k+1} for a total of $$T = \sum_{j=1}^{3} K_j = 8$$

resources.

A first mechanism for increasing the multiplexing capacity of a single HARQ-ACK signal, in terms of the number of HARQ-ACK bits it can convey per UE, is to allow the same resource to be used in one of the two slots for the transmission of different HARQ-ACK bits (the resource may be different in the two slots). Then, for L=2 slots in the exemplary embodiment, the total number of resource combinations is $T^L$. The total number of combinations for the values of M HARQ-ACK bits is $2^M$. Resource selection with QPSK modulation can support the transmission of M HARQ-ACK bits if $2^{M-2} \leq T^L$. Table 1 illustrates the transmission of M=8 HARQ-ACK bits assuming N=4 DL CCs, $K_j=2$ CCEs (j=1, \ldots, N), and L=2 slots for the transmission of the SA in each DL CC. Therefore, T=8, $T^L=64$, and $2^{M-2}=64$.

TABLE 1

Mapping of HARQ-ACK Bits to Resources-Single HARQ-ACK Signal Transmission.

| ACK → −1, NAK → 1 Combinations of Bits | DL CC Link of UL Resources for Transmission in 1st Slot | DL CC Link of UL Resources for Transmission in 2nd Slot |
| --- | --- | --- |
| {1, 1, 1, 1, 1, 1} | DL CC1, CCE1 (Resource 1) | DL CC1, CCE1 (Resource 1) |
| {1, 1, 1, 1, 1, −1} | DL CC1, CCE1 (Resource 1) | DL CC1, CCE2 (Resource 2) |
| {1, 1, 1, 1, −1, 1} | DL CC1, CCE1 (Resource 1) | DL CC2, CCE1 (Resource 3) |
| {1, 1, 1, 1, −1, −1} | DL CC1, CCE1 (Resource 1) | DL CC2, CCE2 (Resource 4) |
| {1, 1, 1, −1, 1, 1} | DL CC1, CCE1 (Resource 1) | DL CC3, CCE1 (Resource 5) |
| {1, 1, 1, −1, 1, −1} | DL CC1, CCE1 (Resource 1) | DL CC3, CCE2 (Resource 6) |
| {1, 1, 1, −1, −1, 1} | DL CC1, CCE1 (Resource 1) | DL CC4, CCE1 (Resource 7) |
| {1, 1, 1, −1, −1, −1} | DL CC1, CCE1 (Resource 1) | DL CC4, CCE2 (Resource 8) |
| {1, 1, −1, 1, 1, 1} | DL CC1, CCE2 (Resource 2) | DL CC1, CCE1 (Resource 1) |
| {1, 1, −1, 1, 1, −1} | DL CC1, CCE2 (Resource 2) | DL CC1, CCE2 (Resource 2) |
| {1, 1, −1, 1, −1, 1} | DL CC1, CCE2 (Resource 2) | DL CC2, CCE1 (Resource 3) |
| {1, 1, −1, 1, −1, −1} | DL CC1, CCE2 (Resource 2) | DL CC2, CCE2 (Resource 4) |

TABLE 1-continued

Mapping of HARQ-ACK Bits to Resources-Single HARQ-ACK Signal Transmission.

| ACK → −1, NAK → 1 Combinations of Bits | DL CC Link of UL Resources for Transmission in 1st Slot | DL CC Link of UL Resources for Transmission in 2nd Slot |
| --- | --- | --- |
| {1, 1, −1, −1, 1, 1} | DL CC1, CCE2 (Resource 2) | DL CC3, CCE1 (Resource 5) |
| {1, 1, −1, −1, 1, −1} | DL CC1, CCE2 (Resource 2) | DL CC3, CCE2 (Resource 6) |
| {1, 1, −1, −1, −1, 1} | DL CC1, CCE2 (Resource 2) | DL CC4, CCE1 (Resource 7) |
| {1, 1, −1, −1, −1, −1} | DL CC1, CCE2 (Resource 2) | DL CC4, CCE2 (Resource 8) |
| {1, −1, 1, 1, 1, 1} | DL CC2, CCE1 (Resource 3) | DL CC1, CCE1 (Resource 1) |
| {1, −1, 1, 1, 1, −1} | DL CC2, CCE1 (Resource 3) | DL CC1, CCE2 (Resource 2) |
| {1, −1, 1, 1, −1, 1} | DL CC2, CCE1 (Resource 3) | DL CC2, CCE1 (Resource 3) |
| {1, −1, 1, 1, −1, −1} | DL CC2, CCE1 (Resource 3) | DL CC2, CCE2 (Resource 4) |
| {1, −1, 1, −1, 1, 1} | DL CC2, CCE1 (Resource 3) | DL CC3, CCE1 (Resource 5) |
| {1, −1, 1, −1, 1, −1} | DL CC2, CCE1 (Resource 3) | DL CC3, CCE2 (Resource 6) |
| {1, −1, 1, −1, −1, 1} | DL CC2, CCE1 (Resource 3) | DL CC4, CCE1 (Resource 7) |
| {1, −1, 1, −1, −1, −1} | DL CC2, CCE1 (Resource 3) | DL CC4, CCE2 (Resource 8) |
| {1, −1, −1, 1, 1, 1} | DL CC2, CCE2 (Resource 4) | DL CC1, CCE1 (Resource 1) |
| {1, −1, −1, 1, 1, −1} | DL CC2, CCE2 (Resource 4) | DL CC1, CCE2 (Resource 2) |
| {1, −1, −1, 1, −1, 1} | DL CC2, CCE2 (Resource 4) | DL CC2, CCE1 (Resource 3) |
| {1, −1, −1, 1, −1, −1} | DL CC2, CCE2 (Resource 4) | DL CC2, CCE2 (Resource 4) |
| {1, −1, −1, −1, 1, 1} | DL CC2, CCE2 (Resource 4) | DL CC3, CCE1 (Resource 5) |
| {1, −1, −1, −1, 1, −1} | DL CC2, CCE2 (Resource 4) | DL CC3, CCE2 (Resource 6) |
| {1, −1, −1, −1, −1, 1} | DL CC4, CCE2 (Resource 4) | DL CC4, CCE1 (Resource 7) |
| {1, −1, −1, −1, −1, −1} | DL CC2, CCE2 (Resource 4) | DL CC4, CCE2 (Resource 8) |
| {−1, 1, 1, 1, 1, 1} | DL CC3, CCE1 (Resource 5) | DL CC1, CCE1 (Resource 1) |
| {−1, 1, 1, 1, 1, −1} | DL CC3, CCE1 (Resource 5) | DL CC1, CCE2 (Resource 2) |
| {−1, 1, 1, 1, −1, 1} | DL CC3, CCE1 (Resource 5) | DL CC2, CCE1 (Resource 3) |
| {−1, 1, 1, 1, −1, −1} | DL CC3, CCE1 (Resource 5) | DL CC2, CCE2 (Resource 4) |
| {−1, 1, 1, −1, 1, 1} | DL CC3, CCE1 (Resource 5) | DL CC3, CCE1 (Resource 5) |
| {−1, 1, 1, −1, 1, −1} | DL CC3, CCE1 (Resource 5) | DL CC3, CCE2 (Resource 6) |
| {−1, 1, 1, −1, −1, 1} | DL CC3, CCE1 (Resource 5) | DL CC4, CCE1 (Resource 7) |
| {−1, 1, 1, −1, −1, −1} | DL CC3, CCE1 (Resource 5) | DL CC4, CCE2 (Resource 8) |
| {−1, 1, −1, 1, 1, 1} | DL CC3, CCE2 (Resource 6) | DL CC1, CCE1 (Resource 1) |
| {−1, 1, −1, 1, 1, −1} | DL CC3, CCE2 (Resource 6) | DL CC1, CCE2 (Resource 2) |
| {−1, 1, −1, 1, −1, 1} | DL CC3, CCE2 (Resource 6) | DL CC2, CCE1 (Resource 3) |
| {−1, 1, −1, 1, −1, −1} | DL CC3, CCE2 (Resource 6) | DL CC2, CCE2 (Resource 4) |
| {−1, 1, −1, −1, 1, 1} | DL CC3, CCE2 (Resource 6) | DL CC3, CCE1 (Resource 5) |
| {−1, 1, −1, −1, 1, −1} | DL CC3, CCE2 (Resource 6) | DL CC3, CCE2 (Resource 6) |
| {−1, 1, −1, −1, −1, 1} | DL CC3, CCE2 (Resource 6) | DL CC4, CCE1 (Resource 7) |
| {−1, 1, −1, −1, −1, −1} | DL CC3, CCE2 (Resource 6) | DL CC4, CCE2 (Resource 8) |
| {−1, −1, 1, 1, 1, 1} | DL CC4, CCE1 (Resource 7) | DL CC1, CCE1 (Resource 1) |
| {−1, −1, 1, 1, 1, −1} | DL CC4, CCE1 (Resource 7) | DL CC1, CCE2 (Resource 2) |
| {−1, −1, 1, 1, −1, 1} | DL CC4, CCE1 (Resource 7) | DL CC2, CCE1 (Resource 3) |
| {−1, −1, 1, 1, −1, −1} | DL CC4, CCE1 (Resource 7) | DL CC2, CCE2 (Resource 4) |
| {−1, −1, 1, −1, 1, 1} | DL CC4, CCE1 (Resource 7) | DL CC3, CCE1 (Resource 5) |
| {−1, −1, 1, −1, 1, −1} | DL CC4, CCE1 (Resource 7) | DL CC3, CCE2 (Resource 6) |
| {−1, −1, 1, −1, −1, 1} | DL CC4, CCE1 (Resource 7) | DL CC4, CCE1 (Resource 7) |
| {−1, −1, 1, −1, −1, −1} | DL CC4, CCE1 (Resource 7) | DL CC4, CCE2 (Resource 8) |
| {−1, −1, −1, 1, 1, 1} | DL CC4, CCE2 (Resource 8) | DL CC1, CCE1 (Resource 1) |
| {−1, −1, −1, 1, 1, −1} | DL CC4, CCE2 (Resource 8) | DL CC1, CCE2 (Resource 2) |
| {−1, −1, −1, 1, −1, 1} | DL CC4, CCE2 (Resource 8) | DL CC2, CCE1 (Resource 3) |
| {−1, −1, −1, 1, −1, −1} | DL CC4, CCE2 (Resource 8) | DL CC2, CCE2 (Resource 4) |
| {−1, −1, −1, −1, 1, 1} | DL CC4, CCE2 (Resource 8) | DL CC3, CCE1 (Resource 5) |
| {−1, −1, −1, −1, 1, −1} | DL CC4, CCE2 (Resource 8) | DL CC3, CCE2 (Resource 6) |
| {−1, −1, −1, −1, −1, 1} | DL CC4, CCE2 (Resource 8) | DL CC4, CCE1 (Resource 7) |
| {−1, −1, −1, −1, −1, −1} | DL CC4, CCE2 (Resource 8) | DL CC4, CCE2 (Resource 8) |

If $2^{M-2} > T^L$, or resource sharing by different HARQ-ACK bits in one of the two slots is not desired, or if only a sub-set of the total available resources should be used in order to avoid more frequent than desired error events, additional mechanisms can apply for the transmission of M HARQ-ACK bits. It should be noted that the Node B can choose to increase the number of CCEs used for the SA transmission in some of the DL CCs in order to increase the value of L and satisfy the condition $2^{M-2} \le T^L$ or increase its margin if additional mechanisms are either not available or not desired.

A second mechanism for increasing the multiplexing capacity of a single HARQ-ACK signal, in terms of the number of HARQ-ACK bits it can convey per UE, is to adapt the modulation order of the transmitted signal. For a single UE transmitter antenna, the necessary condition for supporting the transmission of M HARQ-ACK bits over T distinct resources (no resource is shared in any slot of the sub-frame for the transmission of different HARQ-ACK bits) becomes $2^{M-Q} \le T$ where Q is the number of bits that can be conveyed for a given modulation order (Q=1 for BPSK, Q=2 for QPSK, Q=3 for 8PSK, and Q=4 for QAM 16). For example, assuming N=4 DL CCs with $K_j=4$ (j=1, . . . , N) CCEs for the SA transmission and 2 TBs transmitted to the UE per DL CC, the UE needs to transmit M=8 HARQ-ACK bits over T=16 distinct resources. Using QAM 16 modulation, 4 HARQ-ACK bits can be conveyed and each of the 16 combinations for the remaining 4 HARQ-ACK bits can be accommodated by the UE respectively selecting one of the 16 available resources, as shown for example in Table 2.

TABLE 2

Mapping of HARQ-ACK Bits to Resources-Single HARQ-ACK Signal Transmission.

| ACK → −1, NAK → 1 Combinations of Bits | DL CC Link of UL Resource |
|---|---|
| {1, 1, 1, 1} | DL CC1, CCE1 (Resource 1) |
| {1, 1, 1, −1} | DL CC1, CCE2 (Resource 2) |
| {1, 1,−1, 1} | DL CC1, CCE3 (Resource 3) |
| {1, 1, −1, −1} | DL CC1, CCE4 (Resource 4) |
| {1, −1, 1, 1} | DL CC2, CCE1 (Resource 5) |
| {1, −1, 1, −1} | DL CC2, CCE2 (Resource 6) |
| {1, −1, −1, 1} | DL CC2, CCE3 (Resource 7) |
| {1, −1, −1, −1} | DL CC2, CCE4 (Resource 8) |
| {−1, 1, 1, 1} | DL CC3, CCE1 (Resource 9) |
| {−1, 1, 1, −1} | DL CC3, CCE2 (Resource 10) |
| {−1, 1, −1, 1} | DL CC3, CCE3 (Resource 11) |
| {−1, 1,−1, −1} | DL CC3, CCE4 (Resource 12) |
| {−1, −1, 1, 1} | DL CC4, CCE1 (Resource 13) |
| {−1, −1, 1, −1} | DL CC4, CCE2 (Resource 14) |
| {−1, −1, −1, 1} | DL CC4, CCE3 (Resource 15) |
| {−1, −1, −1, −1} | DL CC4, CCE4 (Resource 16) |

A third mechanism for increasing the multiplexing capacity of a single HARQ-ACK signal (per antenna), in terms of the number of HARQ-ACK bits it can convey per UE, applies in case the UE has 2 transmitter antennas (with each antenna having its own power amplifier). Then, the number of M HARQ-ACK bits can be divided among the two antennas with the first antenna transmitting $\lceil M/2 \rceil$ HARQ-ACK bits using, for example, odd numbered UL resources and the second antenna transmitting $\lfloor M/2 \rfloor$ HARQ-ACK bits using even numbered UL resources, where the $\lceil \ \rceil$ (ceiling) function rounds a number to its next integer and the $\lfloor \ \rfloor$ (floor) function rounds a number to its previous integer. Then, the available UL resources are sufficient for transmitting M HARQ-ACK bits using a modulation conveying Q bits if $2^{\lceil M/2 \rceil - Q} \le \lceil T/2 \rceil$ for the first antenna and if $2^{\lfloor M/2 \rfloor - Q} \le \lfloor T/2 \rfloor$ for the second antenna. For example, for T=8 (such as for N=4 DL CCs with $K_j=2(j=1, \ldots, N)$ CCEs for the SA transmission), if M=8 HARQ-ACK bits need to be transmitted (2 TBs for each of the N=4 DL CCs), the first UE antenna can transmit $\lceil M/2 \rceil = 4$ HARQ-ACK bits, using for example QPSK modulation for 2 HARQ-ACK bits and resource selection for 2 HARQ-ACK bits, and the second antenna can also transmit $\lfloor M/2 \rfloor = 4$ HARQ-ACK bits using the same approach as for the first antenna. Nevertheless, different modulation may be used by each the two UE transmitter antennas (such as QAM 16 for the first antenna and QPSK for the second antenna). The available resources per antenna are $\lceil T/2 \rceil = \lfloor T/2 \rfloor = 4$ and can accommodate the $2^{\lceil M/2 \rceil - Q} = q^{\lfloor M/2 \rfloor - Q} = 4$ combinations of the 2 HARQ-ACK bits conveyed through resource selection per antenna. Table 3 shows an exemplary allocation of the odd numbered resources to the first antenna and of the even numbered resources to the second antenna to convey the value of 2 HARQ-ACK bits through resource selection.

A fourth mechanism for increasing the multiplexing capacity of a single HARQ-ACK channel, in terms of the number of HARQ-ACK bits it can convey per UE, is to adaptively configure a UE to either use higher order modulation, as it was previously described, or to bundle multiple HARQ-ACK bits corresponding to multiple TBs transmitted per DL CC into a single HARQ-ACK bit. In this manner, UEs with adequately high SINR can still transmit an HARQ-ACK bit for every received TB using higher order modulation while UEs not having adequately high SINR to support higher order modulation can transmit a single HARQ-ACK bit resulting from bundling the individual HARQ-ACK bits for each TB per DL CC. The bundled HARQ-ACK bit has the value of ACK if all individual bits are ACK and has the value of NAK if any of the individual bits is NAK. Bundling of HARQ-ACK bits per DL CC results to the transmission of a single HARQ-ACK bit per DL CC and M=N.

A fifth mechanism for increasing the multiplexing capacity of a single HARQ-ACK signal, in terms of the number of HARQ-ACK bits it can convey per UE per TTI, is to transmit different HARQ-ACK bits in each of the L=2 slots or in each of the two parts of each slot where HARQ-ACK bits are transmitted. In the first case, the UE transmits the same HARQ-ACK bits in each slot but different HARQ-ACK bits per slot. In the second case, the UE transmits different HARQ-ACK bits in each half of each slot (using length-2 OCC, instead of length-4 OCC) and the same HARQ-ACK bits in both slots. Then, the available UL resources are sufficient for transmitting M HARQ-ACK bits using a modulation conveying Q bits in each slot is $2^{\lceil M/2 \rceil - Q} \le T$. If different HARQ-ACK bits are transmitted is each half of each slot, then the available UL resources are sufficient for transmitting M HARQ-ACK bits using a modulation conveying Q bits in each slot if $2^{\lceil M/4 \rceil - Q} \le T$.

Although, for simplicity, the HARQ-ACK signal is assumed to use the same modulation scheme in each slot or in each half of each slot, this is not necessary and different modulation schemes may instead be used. For example, for T=10 (such as for N=10 DL CCs with $K_j=2(j=1, \ldots, N)$ CCEs for the SA transmission), if M=10 HARQ-ACK bits need to be transmitted (2 TBs transmitted in each DL CC), the first 5 bits can be transmitted in the first slot, or in the first half of the first slot, and the second 5 bits can be transmitted in the second slot, or in the second half of each slot, using QPSK to convey the first 2 of the 5 bits and using resource selection among the T=10 resources to convey the last 3 of the 5 bits in each slot. Table 4 shows an exemplary resource selection to convey 3 HARQ-ACK bits in the first slot (the same resource selection setup can apply to convey 3 HARQ-ACK bits in the second slot).

TABLE 3

Mapping Odd/Even Resources to HARQ-ACK Bits from First/Second UE Antenna.

| ACK → −1, NAK → 1 Combinations of Bits | DL CC Link of UL Resources for Transmission by First UE Antenna | DL CC Link of UL Resources for Transmission by Second UE Antenna |
|---|---|---|
| {1, 1} | DL CC1, CCE1 (Resource 1) | DL CC1, CCE2 (Resource 2) |
| {1, −1} | DL CC2, CCE1 (Resource 3) | DL CC2, CCE2 (Resource 4) |
| {−1, 1} | DL CC3, CCE1 (Resource 5) | DL CC3, CCE2 (Resource 6) |
| {−1, −1} | DL CC4, CCE1 (Resource 7) | DL CC4, CCE2 (Resource 8) |

TABLE 4

Mapping HARQ-ACK Bits to Resources-HARQ-ACK Signal Transmission in One Slot.

ACK → −1, NAK → 1

| Combinations of Bits | DL CC Link of UL Resource |
|---|---|
| {1, 1, 1} | DL CC1, CCE1 (Resource 1) |
| {1, 1, −1} | DL CC1, CCE2 (Resource 2) |
| {1, −1, 1} | DL CC2, CCE1 (Resource 3) |
| {1, −1, −1} | DL CC2, CCE2 (Resource 4) |
| {−1, 1, 1} | DL CC3, CCE1 (Resource 5) |
| {−1, 1, −1} | DL CC3, CCE2 (Resource 6) |
| {−1, −1, 1} | DL CC4, CCE1 (Resource 7) |
| {−1, −1, −1} | DL CC4, CCE2 (Resource 8) |

Figure 9:
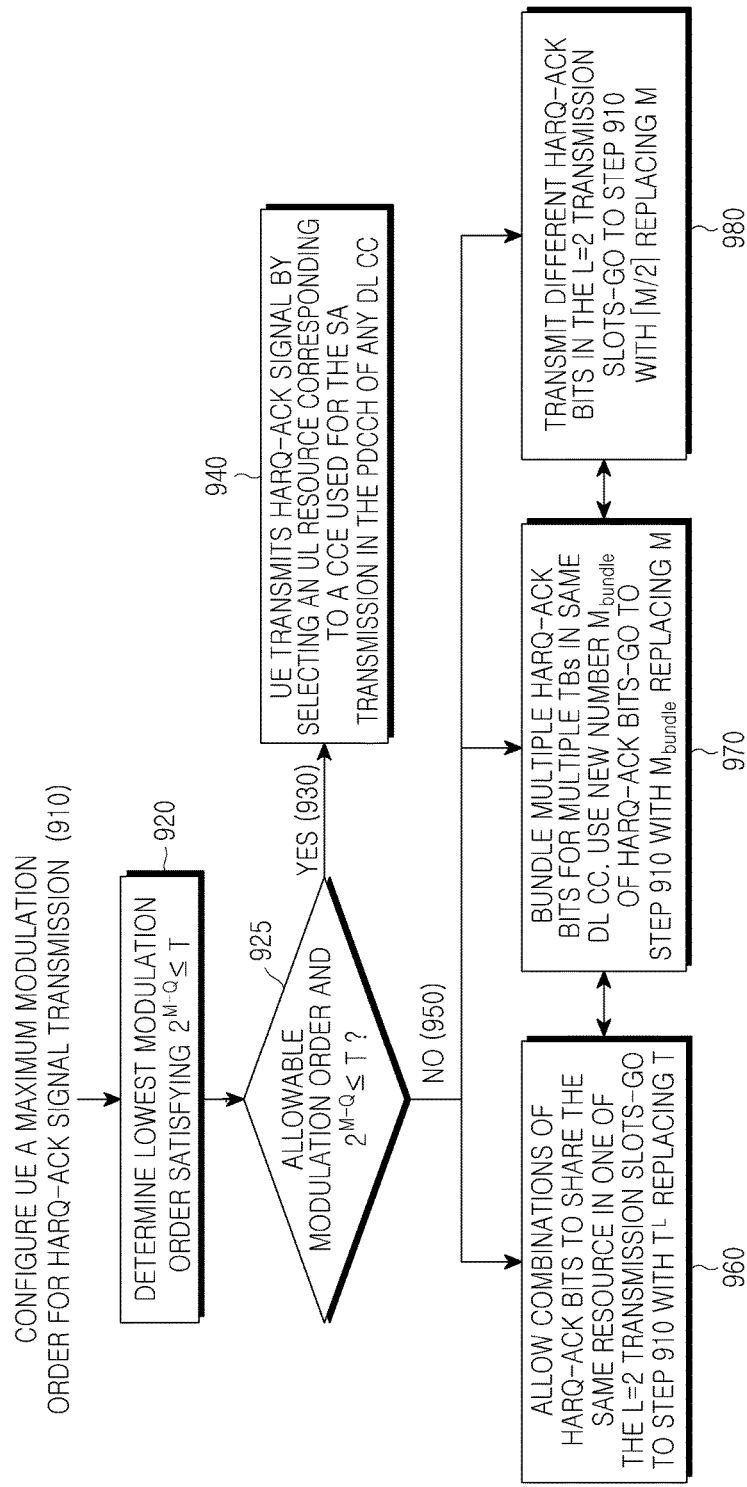
FIG. 9 is a diagram illustrating a first exemplary parameter selection process for the HARQ-ACK signal transmission method depending on the number of HARQ-ACK bits.

Among the previously described mechanisms for the transmission of a single HARQ-ACK signal, an exemplary decision process in case of a single UE transmitter antenna is described in FIG. 9 and is as follows:

a) Configure per UE maximum modulation order for HARQ-ACK signal transmission 910.

b) The UE determines the smallest modulation order satisfying $2^{M-Q} \leq T$ 920 and determines if it belongs in the allowable modulation orders the UE is configured 925.

a. If $2^{M-Q} \leq T$ 930, the UE transmits the HARQ-ACK signal with the selected modulation order and using resource selection as it was previously described 940 (different combinations of HARQ-ACK bits use different resources in all slots).

b. If $2^{M-Q} > T$ 950 for all allowable modulation orders, the UE can be configured to perform any combination of the following:

*64 i. Allow combinations of HARQ-ACK bits to share the same resource in one of the L=2 transmission slots 960. Then, the second step is repeated with the condition $2^{M-Q} \leq T^L$ replacing $2^{M-Q} \leq T$.

ii. Bundle multiple HARQ-ACK bits respectively corresponding to multiple TBs received by the UE per DL CC 970. Then, using the new number $M_{bundle}$ of HARQ-ACK bits resulting after bundling, the second step is repeated with the condition $2^{\lceil M/2 \rceil - Q} \leq T$ replacing $2^{M-Q} \leq T$.

iii. Transmit (partly or completely) different HARQ-ACK bits in the L=2 transmission slots 980. Then, the second step is repeated with the condition $2^{\lceil M/2 \rceil - Q} \leq T$ replacing $2^{M-Q} \leq T$.

Figure 10:
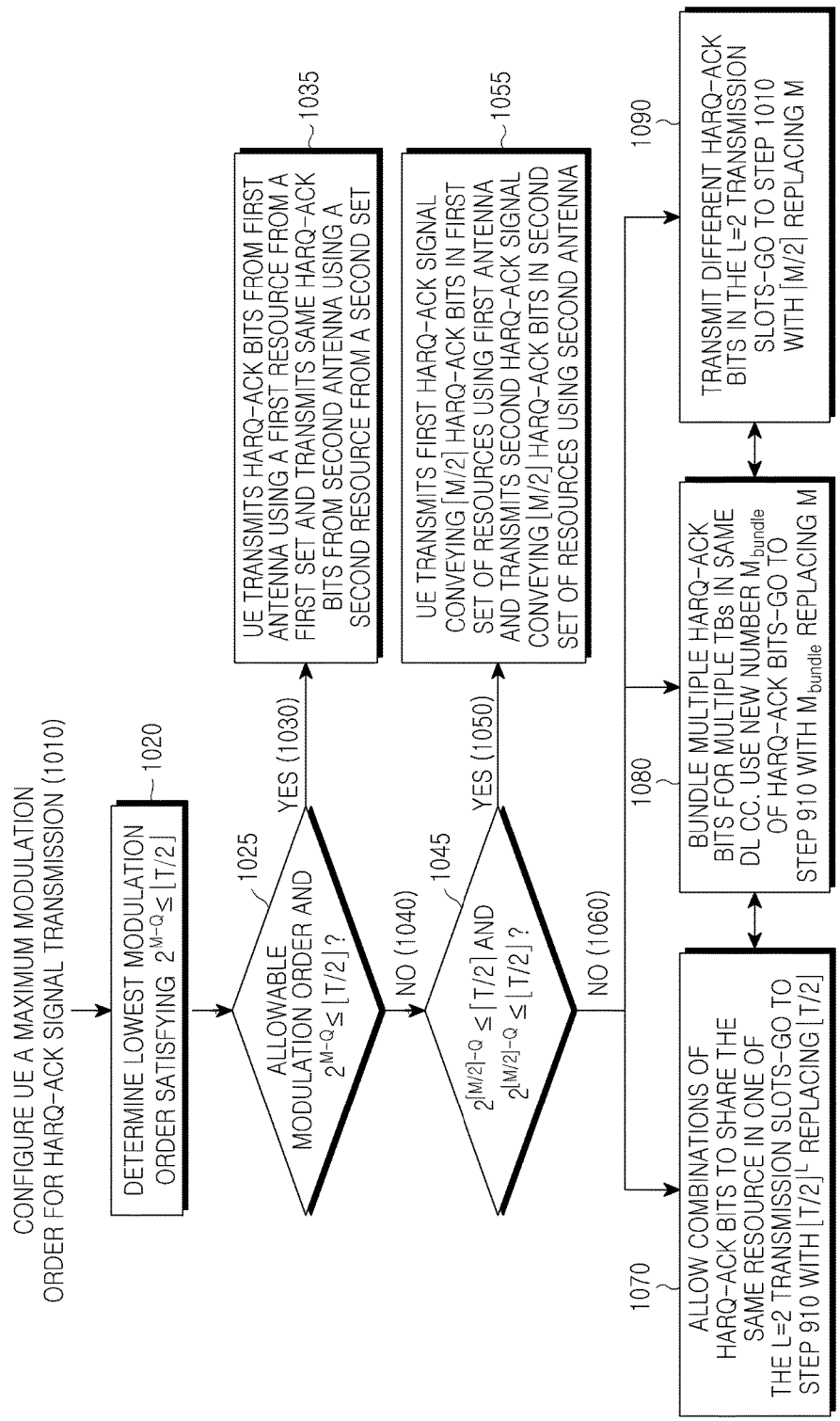
FIG. 10 is a diagram illustrating a second exemplary parameter selection process for the HARQ-ACK signal transmission method depending on the number of HARQ-ACK bits.

If the UE has 2 transmitter antennas, an exemplary decision process is described in FIG. 10 and is as follows:

a) Configure per UE a maximum modulation order for HARQ-ACK signal transmission 1010.

b) The UE determines the smallest modulation order satisfying $2^{M-Q} \leq \lfloor T/2 \rfloor$ 1020 and determines if it belongs in its allowable modulation orders the UE is configured 1025.

a. If $2^{M-Q} \leq \lfloor T/2 \rfloor$ 1030 and the UE is configured transmitter antenna diversity, the UE signals the HARQ-ACK bits from the first antenna using a first resource from a first set of resources and signals the same HARQ-ACK bits from the second antenna using a second resource from a second set of resources 1035, wherein the first set and second set of resources do not any common element.

b. If $2^{M-Q} > \lfloor T/2 \rfloor$ 1040, the UE examines if $2^{\lceil M/2 \rceil - Q} \leq \lceil T/2 \rceil$ and $2^{\lfloor M/2 \rfloor - Q} \leq \lfloor T/2 \rfloor$ 1045.

i. If $2^{\lceil M/2 \rceil - Q} \leq \lceil T/2 \rceil$ and $2^{\lfloor M/2 \rfloor - Q} \leq \lfloor T/2 \rfloor$ 1050, the UE transmits a first HARQ-ACK signal conveying $\lceil M/2 \rceil$ HARQ-ACK bits in a first set of resources using the first transmitter antenna and transmits a second HARQ-ACK signal conveying $\lfloor M/2 \rfloor$ HARQ-ACK bits in a second set of resources using the second transmitter antenna 1055, wherein the first set and second set of resources do not any common element.

ii. If $2^{\lceil M/2 \rceil - Q} > \lceil T/2 \rceil$ or $2^{\lfloor M/2 \rfloor - Q} > \lfloor T/2 \rfloor$ 1060, the UE can be configured to perform any combination of the following:

1. Allow combinations of HARQ-ACK bits to share the same resource in one of the L transmission slots (in the exemplary embodiment L=2) 1070. Then, the second step is repeated with the condition $2^{M-Q} \leq \lfloor T/2 \rfloor^L$ replacing $2^{M-Q} \leq \lfloor T/2 \rfloor$.

2. Bundle multiple HARQ-ACK bits respectively corresponding to multiple TBs received by the UE per DL CC 1080. Then, using the new number M of HARQ-ACK bits resulting after bundling, the second step is repeated with the condition $2^{M_{bundle} - Q} \leq \lfloor T/2 \rfloor$ replacing $2^{M-Q} \leq \lfloor T/2 \rfloor$.

3. Transmit (partly or completely) different HARQ-ACK bits in the L=2 transmission slots 1090. Then, the second step is repeated with the condition $2^{\lceil M/2 \rceil - Q} \leq \lfloor T/2 \rfloor$ replacing $2^{M-Q} \leq \lfloor T/2 \rfloor$.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A method for transmitting hybrid automatic repeat request acknowledgement (HARQ-ACK) information by a terminal in a wireless communication system, the method comprising:
 receiving one or more transport blocks;
 determining a number of HARQ-ACK bits in response to the one or more transport blocks;
 determining an uplink resource for transmission of the HARQ-ACK bits; and
 transmitting the HARQ-ACK bits by using the determined uplink resource,
 wherein the uplink resource is associated with a first modulation order or with a second modulation order depending on the number of HARQ-ACK bits, and
 wherein the first modulation order is different from the second modulation order.

2. The method of claim 1,
 wherein the one or more transport blocks comprises a first transport block and a second transport block, and
 wherein the first transport block is received on a first downlink carrier and the second transport block is received on a second downlink carrier.

3. The method of claim 1, wherein determining the uplink resource comprises:
 determining the uplink resource as a first uplink resource associated with the first modulation order for transmission of the HARQ-ACK bits, in response to the number of HARQ-ACK bits having a first number of bits; and
 determining the uplink resource as a second uplink resource associated with the second modulation order for transmission of the HARQ-ACK bits, in response to the HARQ-ACK signal having a second number of bits.

4. A terminal for transmitting hybrid automatic repeat request acknowledgement (HARQ-ACK) information in a wireless communication system, the terminal comprising:
 a transceiver; and
 a controller coupled with the transceiver and configured to control to:

receive one or more transport blocks,
determine a number of HARQ-ACK bits in response to the one or more transport blocks,
determine an uplink resource for transmission of the HARQ-ACK bits, and
transmit the HARQ-ACK bits by using the determined uplink resource,
wherein the uplink resource is associated with a first modulation order or with a second modulation order depending on the number of HARQ-ACK bits, and
wherein the first modulation order is different from the second modulation order.

5. The terminal of claim 4,
wherein the one or more transport blocks comprises a first transport block and a second transport block, and
wherein the first transport block is received on a first downlink carrier and the second transport block is received on a second downlink carrier.

6. The terminal of claim 4, wherein the controller is further configured to:
determine the uplink resource as a first uplink resource associated with the first modulation order for transmission of the HARQ-ACK bits, in response to the number of HARQ-ACK bits having a first number of bits; and
determine the uplink resource as a second uplink resource associated with the second modulation order for transmission of the HARQ-ACK bits, in response to the HARQ-ACK signal having a second number of bits.

7. A method for receiving hybrid automatic repeat request acknowledgement (HARQ-ACK) information by a base station in a wireless communication system, the method comprising:
transmitting one or more transport blocks;
determining a number of HARQ-ACK bits in response to the one or more transport blocks;
determining an uplink resource for transmission of the HARQ-ACK bits; and
receiving the HARQ-ACK bits by using the determined uplink resource,
wherein the uplink resource is associated with a first modulation order or with a second modulation order depending on the number of HARQ-ACK bits, and
wherein the first modulation order is different from the second modulation order.

8. The method of claim 7,
wherein the one or more transport blocks comprises a first transport block and a second transport block, and
wherein the first transport block is received on a first downlink carrier and the second transport block is received on a second downlink carrier.

9. The method of claim 7, wherein determining the uplink resource comprises:
determining the uplink resource as a first uplink resource associated with the first modulation order for transmission of the HARQ-ACK bits, in response to the number of HARQ-ACK bits having a first number of bits; and
determining the uplink resource as a second uplink resource associated with the second modulation order for transmission of the HARQ-ACK bits, in response to the HARQ-ACK signal having a second number of bits.

10. A base station for receiving hybrid automatic repeat request acknowledgement (HARQ-ACK) information by a base station in a wireless communication system, the base station comprising:
a transceiver; and
a controller coupled with the transceiver and configured control to:
transmit one or more transport blocks,
determine a number of HARQ-ACK bits in response to the one or more transport blocks,
determine an uplink resource for transmission of the HARQ-ACK bits, and
receive the HARQ-ACK bits by using the determined uplink resource,
wherein the uplink resource is associated with a first modulation order or with a second modulation order depending on the number of HARQ-ACK bits, and
wherein the first modulation order is different from the second modulation order.

11. The base station of claim 10,
wherein the one or more transport blocks comprises a first transport block and a second transport block, and
wherein the first transport block is received on a first downlink carrier and the second transport block is received on a second downlink carrier.

12. The base station of claim 10, wherein the controller is further configured to:
determine the uplink resource as a first uplink resource associated with the first modulation order for transmission of the HARQ-ACK bits, in response to the number of HARQ-ACK bits having a first number of bits; and
determine the uplink resource as a second uplink resource associated with the second modulation order for transmission of the HARQ-ACK bits, in response to the HARQ-ACK signal having a second number of bits.

* * * * *